No. 665,950. Patented Jan. 15, 1901.
H. W. ALDEN.
TOWING APPARATUS FOR BOATS.
(Application filed Sept. 8, 1899.)

(No Model.) 2 Sheets—Sheet 1.

Attest:
A. N. Jesbera.
Andrew H. Scobie.

Inventor:
Herbert W. Alden
by Redding, Kiddle & Greeley
Attys.

No. 665,950. Patented Jan. 15, 1901.
H. W. ALDEN.
TOWING APPARATUS FOR BOATS.
(Application filed Sept. 8, 1899.)

(No Model.) 2 Sheets—Sheet 2.

Attest:
A. N. Jeskra
Andrew H. Scobie

Inventor:
Herbert W. Alden
by Redding, Kiddle & Greeley
Attys.

UNITED STATES PATENT OFFICE.

HERBERT W. ALDEN, OF HARTFORD, CONNECTICUT, ASSIGNOR TO THE ELECTRIC VEHICLE COMPANY, OF JERSEY CITY, NEW JERSEY, AND NEW YORK, N. Y.

TOWING APPARATUS FOR BOATS.

SPECIFICATION forming part of Letters Patent No. 665,950, dated January 15, 1901.

Application filed September 8, 1899. Serial No. 729,818. (No model.)

*To all whom it may concern:*

Be it known that I, HERBERT W. ALDEN, residing in the city of Hartford, county of Hartford, and State of Connecticut, have invented certain new and useful Improvements in Towing Apparatus for Boats, of which the following is a specification, reference being had to the accompanying drawings, forming a part hereof.

This invention has relation to the propulsion of boats through canals. It has been proposed heretofore to mount upon the tow-boat an electric motor which is connected mechanically with a suitable propeller and electrically with a continuous conductor; but there are various objections to such a system, such as the effect of the wash produced by the propeller upon the banks of the canal, the dependence upon the continuous conductor, and the cost of maintenance of such a conductor.

It is the object of this invention to provide a system of propulsion or towing with electricity as the motive power which shall avoid the objections to the trolley system above referred to and shall answer all the requirements of the service.

In accordance with the invention a storage battery is mounted upon a boat or suitable vessel and furnishes current to a suitable electric tractor which travels on the tow-path, such tractor being connected with the battery-boat by an electric conductor and a tow-rope.

It will be obvious that the invention can be practiced with many different details of construction and arrangement; but for purposes of explanation the invention is illustrated in the accompanying drawings as embodied in a convenient and practical form.

Figure 1:
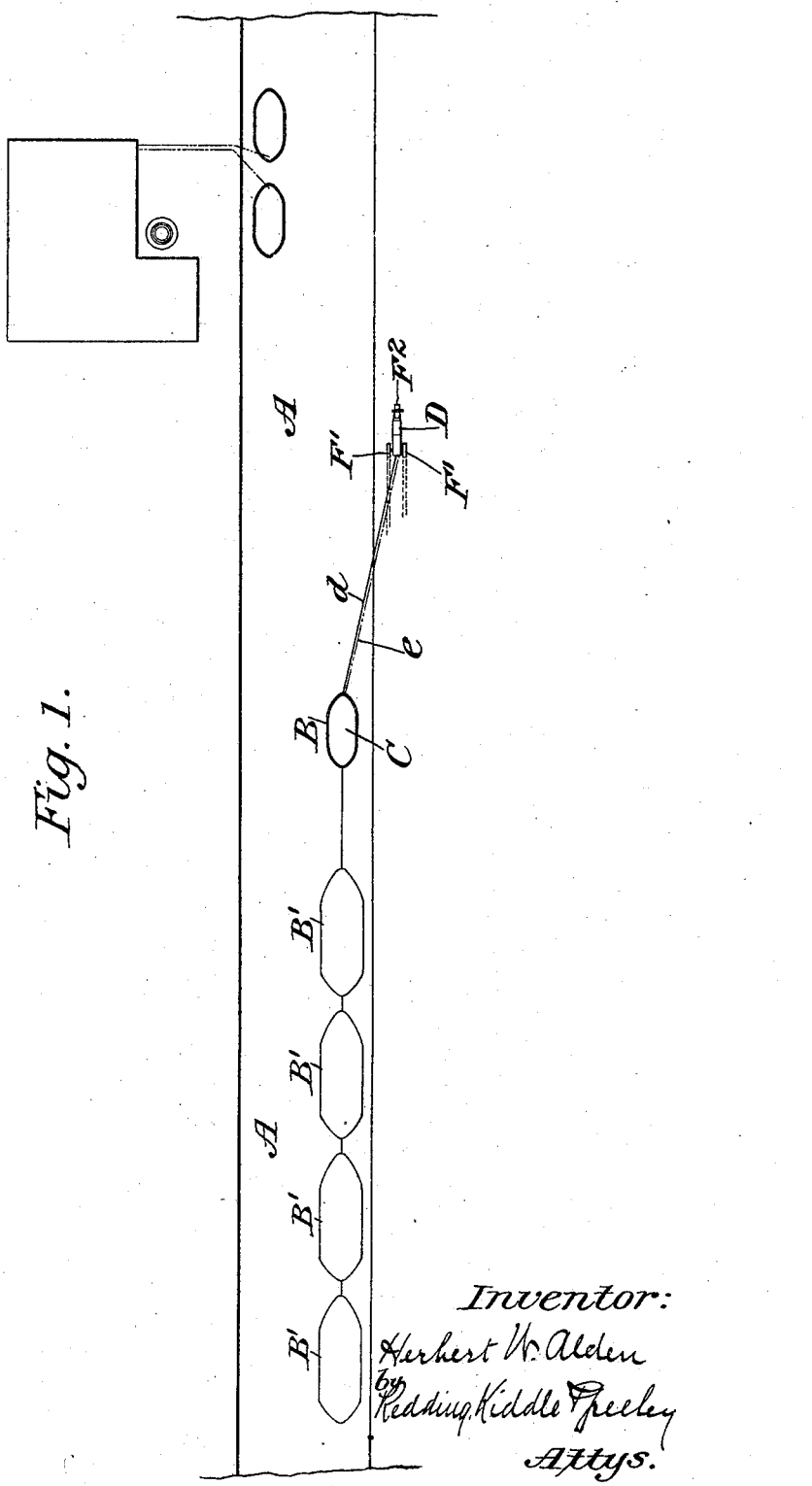
Figure 2:
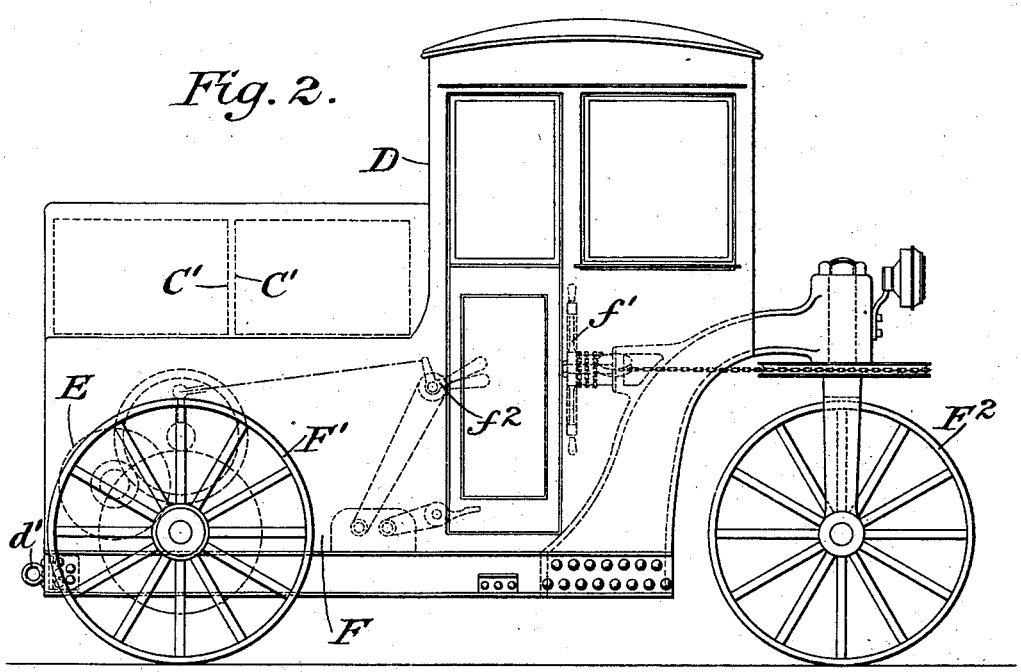
Figure 3:
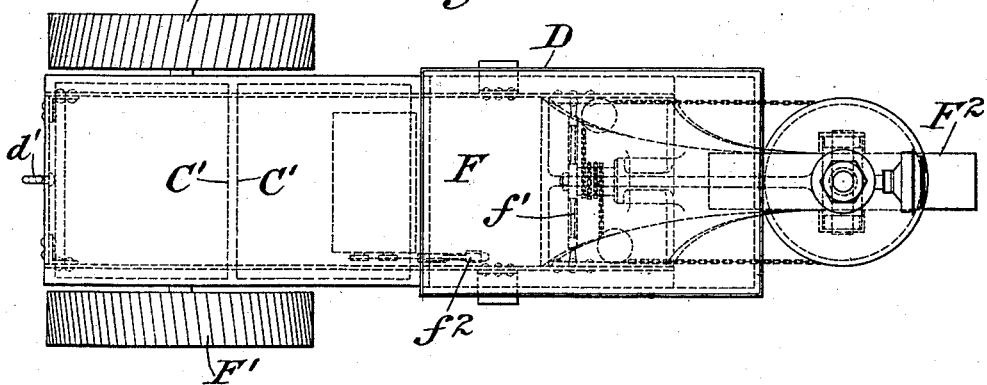

In said drawings, Figure 1 is a diagrammatic view representing the application of the invention. Fig. 2 is a view in side elevation of a suitable tractor. Fig. 3 is a plan view of the same.

In Fig. 1 of the drawings the canal or waterway is represented at A with a tow-boat or battery-boat B therein and having connected with it one or more freight-boats B'. A storage battery C of sufficient capacity for the intended use is suitably placed in the battery-boat B, which obviously may be devoted exclusively to the battery or may carry freight also. Upon the usual tow-path is placed the tractor or electric locomotive D, which may be of any suitable character. It is connected with the battery-boat by a suitable tow-rope $d$, and its motor (indicated at E in Fig. 2) is connected with the battery by a suitable conductor $e$, which may be independent of the tow-rope or combined therewith, as may be found most convenient.

The tractor D represented in the drawings comprises a suitable body F, upon which is mounted the motor E, driving-wheels F', operatively connected with the motor, a steering-wheel $F^2$, and suitable controlling devices, which are indicated at $f'$ and $f^2$, respectively. A small storage battery C' is also mounted upon the tractor-body and may be connected with the motor E for the purpose of enabling the tractor to maneuver around locks, &c., independently of the battery-boat. The tow-line is suitably connected to the tractor, as at $d'$. It will be evident that the invention is not limited in any respect to the particular construction of the tractor shown and described herein, as any form of electric locomotive adapted for the purpose may be employed.

As indicated in Fig. 1 of the drawings, suitable charging-stations are located at intervals along the waterway, so that the storage batteries employed may be kept properly charged.

The system of towing described within presents great advantages in that the weight of the storage batteries being floated in suitable vessels is moved with the minimum of resistance and the least expenditure of power and that all of the pulling effect is on the tractor. The expense of maintaining a line conductor is wholly avoided and the charging-stations can be located at convenient points along the line—as, for example, where water-power is available for the generation of the currents.

I claim as my invention—

In a towing system, the combination with a storage battery, a floating vessel to support the same, a land-tractor comprising a motor, driving-wheels, and steering devices, a storage battery mounted on said tractor, a detachable mechanical connection between said tractor and said battery, an electrical connection between the motor and the storage battery supported by the vessel, also detachable, and an electrical connection between the motor and the storage battery mounted on the vehicle whereby the motor may be operated to drive the tractor independently of the storage battery on the vessel.

This specification signed and witnessed this 23d day of August, A. D. 1899.

HERBERT W. ALDEN.

In presence of—
WILLIAM O. WHITE,
HORACE A. ALDEN.